US011437018B2

(12) United States Patent
Diehl et al.

(10) Patent No.: US 11,437,018 B2
(45) Date of Patent: Sep. 6, 2022

(54) VEHICLE OUTPUT BASED ON LOCAL LANGUAGE/DIALECT

(71) Applicant: Pony AI Inc., Grand Cayman (KY)

(72) Inventors: Peter G. Diehl, Shanghai (CN); Robert Dingli, Cupertino, CA (US)

(73) Assignee: Pony AI Inc., Grand Cayman (KY)

( * ) Notice: Subject to any disclaimer, the term of this patent is extended or adjusted under 35 U.S.C. 154(b) by 244 days.

(21) Appl. No.: 16/818,318

(22) Filed: Mar. 13, 2020

(65) Prior Publication Data

US 2021/0287658 A1    Sep. 16, 2021

(51) Int. Cl.
| | |
|---|---|
| *G10L 15/00* | (2013.01) |
| *G06F 16/9537* | (2019.01) |
| *G10L 15/18* | (2013.01) |
| *G10L 15/22* | (2006.01) |

(52) U.S. Cl.
CPC ........ *G10L 15/005* (2013.01); *G06F 16/9537* (2019.01); *G10L 15/1815* (2013.01); *G10L 15/22* (2013.01); *G10L 2015/227* (2013.01)

(58) Field of Classification Search
CPC ........ G06F 9/454; G10L 15/22; G09B 29/008
See application file for complete search history.

(56) References Cited

U.S. PATENT DOCUMENTS

| | | | | |
|---|---|---|---|---|
| 2007/0178918 A1* | 8/2007 | Shon | ................. | H04M 1/72436 455/466 |
| 2012/0274643 A1* | 11/2012 | Tanaka | ............... | B64D 11/0015 345/467 |
| 2013/0076883 A1* | 3/2013 | Madau | ................... | B60K 35/00 348/78 |
| 2014/0163948 A1* | 6/2014 | Daly | ....................... | G06F 40/58 704/2 |
| 2014/0215330 A1* | 7/2014 | Lee | ...................... | G09B 29/007 715/703 |
| 2015/0245190 A1* | 8/2015 | Hatton | ................... | G08B 25/10 455/404.2 |
| 2016/0174032 A1* | 6/2016 | Xin | ..................... | G06Q 30/0261 455/456.3 |
| 2016/0231135 A1* | 8/2016 | Nishibashi | ............ | G10L 13/086 |
| 2021/0027334 A1* | 1/2021 | Suthar | ................... | H04W 4/021 |

\* cited by examiner

*Primary Examiner* — Daniel Abebe
(74) *Attorney, Agent, or Firm* — Sheppard Mullin Richter & Hampton LLP

(57) ABSTRACT

Described herein are systems, methods, and computer readable media for dynamically determining a language variant to use for vehicle output to a vehicle occupant based on the vehicle's location. A geographic region may include multiple sub-regions, each of which may be associated with a respective one or more language variants. As an example, a geographic region may be a state or province, and each sub-region may have one or more dialects that are spoken by individuals in that sub-region. In some cases, a particular dialect may be predominant in a given sub-region. As a vehicle traverses a travel path, it may determine its current location, which geographic sub-region includes that location, and which language variant (e.g., dialect) is predominant there. That language variant may then be selected for in-vehicle communication with a vehicle occupant. The vehicle location determination may be made at or near where the occupant entered the vehicle.

19 Claims, 7 Drawing Sheets

VEHICLE OUTPUT BASED ON LOCAL LANGUAGE/DIALECT

The present invention relates generally to vehicle output based on language/dialect, and more particularly, in some embodiments, to changing a language/dialect used for audible or text output in the vehicle based on a current location of the vehicle.

BACKGROUND

Advances in vehicle technology in recent years have seen significant growth in in-vehicle voice recognition and artificial intelligence (AI) capabilities. Such capabilities include the ability to detect speech, perform natural language processing on the speech to ascertain meaning, and provide a vehicle response back using one or more output means such as a speaker, a display, or the like. Often, if a preferred language in which to communicate with a vehicle occupant is not known, a default language that is widely understood is chosen. Conventional smart vehicle technologies lack the capability to adjust the language (or any characteristic thereof) in which vehicle output is provided to a vehicle occupant based on dynamically changing conditions. Discussed herein are technical solutions that address this and other technical drawbacks associated with conventional smart vehicle technologies.

SUMMARY

In an example embodiment, a computer-implemented method for selecting and presenting vehicle output in a particular language variant to an occupant of a vehicle is disclosed. The computer-implemented method includes receiving location data indicative of a current location of the vehicle, dynamically determining that the particular language variant is associated with the current location of the vehicle, and presenting the vehicle output in the particular language variant.

In an example embodiment, dynamically determining that the particular language variant is associated with the current location of the vehicle includes identifying a group of geographic regions, each of which is associated with a respective language variant, determining a particular geographic region that includes the current location of the vehicle, and determining that the particular language variant corresponds to the particular geographic region based at least in part on a stored association between the particular language variant and the particular geographic region.

In an example embodiment, there is no existing user profile for the occupant of the vehicle and the current location of the vehicle is a location that is within a predetermined radius of a location at which the occupant entered the vehicle.

In an example embodiment, the occupant of the vehicle is a first occupant, the current location of the vehicle is a first location, and the particular language variant is a first language variant, and the method further includes determining that the first occupant has exited the vehicle and determining that a second occupant has entered the vehicle. In an example embodiment, the method still further includes determining that there is no existing user profile for the second occupant and receiving location data indicative of a second location of the vehicle, where the second location is a location that is within a predetermined radius of a location at which the second occupant entered the vehicle. In an example embodiment, the method additionally includes determining that the second location is associated with a second language variant that is different from the first language variant and switching the vehicle output from the first language variant to the second language variant.

In an example embodiment, determining that the second location is associated with a second language variant that is different from the first language variant includes determining a first geographic region that includes the first location and determining that the first language variant corresponds to the first geographic region based at least in part on a stored association between the first language variant and the first geographic region. In an example embodiment, determining that the second location is associated with a second language variant further includes determining that a second geographic region includes the second location and determining that the second language variant corresponds to the second geographic region based at least in part on a stored association between the second language variant and the second geographic region.

In an example embodiment, the second location is outside of a boundary of the first geographic region. In an example embodiment, the first geographic region and the second geographic region include an overlapping sub-region that includes the second location, and the method further includes selecting the second language variant for the vehicle output based at least in part on a navigation route of the vehicle. In an example embodiment, selecting the second language variant for the vehicle output based at least in part on a navigation route of the vehicle includes determining that the vehicle is travelling along a portion of the navigation route that extends out of the overlapping sub-region and into another sub-region of the second geographic region that does not overlap with the first geographic region.

In an example embodiment, the occupant of the vehicle is a first occupant and the particular language variant is a first language variant, and the method further includes determining that the first occupant has exited the vehicle and determining that a second occupant has entered the vehicle. In an example embodiment, the method additionally includes identifying a user profile for the second occupant, determining that the user profile indicates a preference for a second language variant that is different from the first language variant, and switching the vehicle output from the first language variant to the second language variant.

In an example embodiment, the method further includes receiving sensor data from one or more sensor on-board the vehicle, analyzing the sensor data to determine a quantitative metric indicative of a sentiment of the occupant of the vehicle to the particular language variant, and modifying or creating a user profile for the occupant of the vehicle that indicates the sentiment of the occupant of the vehicle to the particular language variant.

In an example embodiment, a system for selecting and presenting vehicle output in a particular language variant to an occupant of a vehicle is disclosed. The system includes at least one processor and at least one memory storing computer-executable instructions. The at least one processor is configured to access the at least one memory and execute the computer-executable instructions to perform a set of operations including receiving location data indicative of a current location of the vehicle, dynamically determining that the particular language variant is associated with the current location of the vehicle, and presenting the vehicle output in the particular language variant. The above-described system is further configured to perform any of the operations/functions and may include any of the additional features/ aspects of example embodiments of the invention described above in relation to example computer-implemented methods of the invention.

In an example embodiment, a computer program product for selecting and presenting vehicle output in a particular language variant to an occupant of a vehicle is disclosed. The computer program product includes a non-transitory computer-readable medium readable by a processing circuit. The non-transitory computer-readable medium stores instructions executable by the processing circuit to cause a method to be performed. The method includes receiving location data indicative of a current location of the vehicle, dynamically determining that the particular language variant is associated with the current location of the vehicle, and presenting the vehicle output in the particular language variant. The above-described computer program product is further configured to perform any of the operations/functions and may include any of the additional features/aspects of example embodiments of the invention described above in relation to example computer-implemented methods of the invention.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION

Overview

Figure 1:
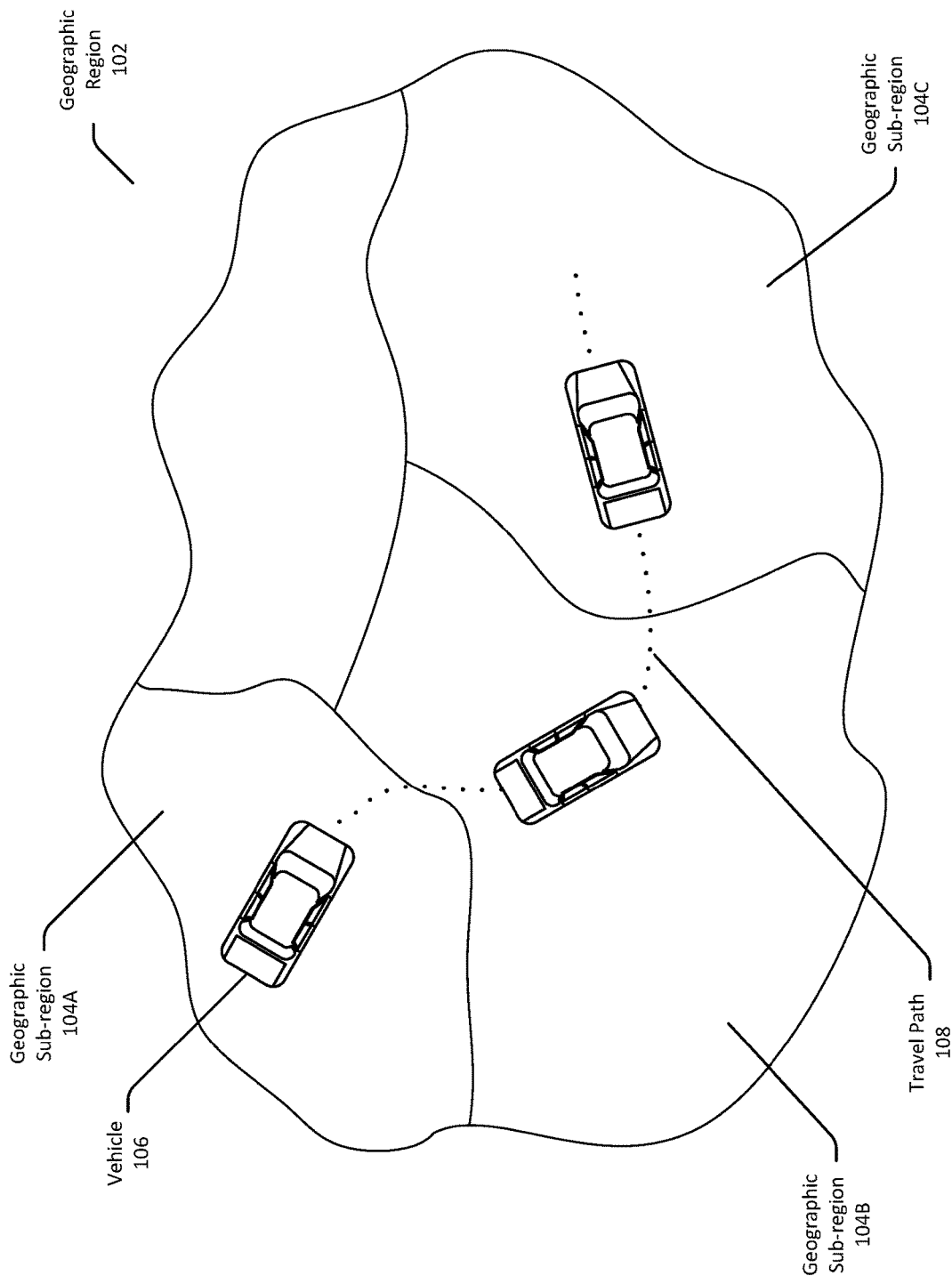
FIG. 1 illustrates a vehicle travel path that traverses multiple geographic sub-regions associated with different language variants in accordance with an example embodiment of the invention.

In the following description, certain specific details are set forth in order to provide a thorough understanding of various embodiments of the invention. However, one skilled in the art will understand that the invention may be practiced without these details. Moreover, while various embodiments of the invention are disclosed herein, many adaptations and modifications may be made within the scope of the invention in accordance with the common general knowledge of those skilled in this art. Such modifications include the substitution of known equivalents for any aspect of the invention in order to achieve the same result in substantially the same way.

Unless the context requires otherwise, throughout the present specification and claims, the word "comprise" and variations thereof, such as, "comprises" and "comprising" are to be construed in an open, inclusive sense, that is as "including, but not limited to." Recitation of numeric ranges of values throughout the specification is intended to serve as a shorthand notation of referring individually to each separate value falling within the range inclusive of the values defining the range, and each separate value is incorporated in the specification as it were individually recited herein. Additionally, the singular forms "a," "an" and "the" include plural referents unless the context clearly dictates otherwise. The phrases "at least one of," "at least one selected from the group of," or "at least one selected from the group consisting of," and the like are to be interpreted in the disjunctive (e.g., not to be interpreted as at least one of A and at least one of B).

Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment, but may be in some instances. Furthermore, the particular features, structures, or characteristics may be combined in any suitable manner in one or more embodiments.

Vehicles have for some time now had the capability to provide predetermined output to a vehicle occupant such as pre-recorded voice or written messages. Often, such predetermined messages are output in response to various conditions being satisfied. For instance, if a vehicle occupant fails to fasten her seat belt within a predetermined period of time, then the vehicle may play a pre-recorded message instructing the vehicle occupant to fasten her seat belt. Recent advances in speech detection, natural language processing, and AI technologies, however, have ushered in a burgeoning era of enhanced vehicle communication capabilities, sometimes referred to as smart vehicle technologies. For instance, some vehicles are now equipped with smart vehicle technologies that include the capability to detect vehicle occupant speech, process the speech to ascertain semantic meaning, and provide a corresponding vehicle response that provides information relevant to the detected speech. The vehicle response may be a response to a query from a vehicle occupant, a query itself, navigation instructions, etc. The vehicle response can be provided via one or more output means including, for example, as voice-based output from a speaker, as text-based output on a display, as tactile output, or the like.

Vehicle output—whether presented as audible output via a speaker or text/graphical output on a display—is provided in a particular language. In some cases, a default language that is widely spoken (e.g., English) may be selected as the language in which to provide the vehicle output. In other scenarios, a user profile may exist for a vehicle occupant that indicates a language preference for the vehicle occupant, in which case, the preferred language may be used to communicate with the vehicle occupant.

There exist scenarios, however, in which the most appropriate language in which to communicate with a vehicle occupant is not known because, for example, the occupant is a new user for whom there is no existing user profile, and thus, no known language preference. Further, for any given language, there are often several corresponding dialects that can differ, sometimes substantially, in sentence construction, vocabulary, accent, and the like. For example, a particular language may be spoken in a particular geographic region. That geographic region may, in turn, encompass multiple geographic sub-regions, each of which may be associated with a respective dialect specific to that sub-region. While a speaker of one dialect may be able to understand another dialect, it is not uncommon for the speakers of two different dialects of the same language to have difficulty comprehending and/or communicating in the other's dialect. The term "language variant" may be used herein to connote a particular variation of a language such as, for example, a particular dialect of a language; a particular accent; or the like. It should be appreciated, however, that the term language variant is not limited to dialects or accents of a language, but may refer to any language itself (including all associated dialects and accents); any of a group of related languages that share one or more linguistic characteristics (e.g., shared vocabulary, shared grammar, shared alphabet, etc.); a group of related languages itself; and so forth.

Conventional smart vehicle technologies lack the capability to dynamically identify a language variant that is most suited/appropriate for communicating with a vehicle occupant for whom there is no information regarding language preferences or capabilities (e.g., no user profile indicating a language preference). Moreover, conventional smart vehicle technologies lack the capability to identify/determine/select a particular language variant for vehicle communication based on dynamically changing factors such as the characteristics/preferences of vehicle occupants, the language variants that are associated with different geographic regions being traversed by a vehicle, and so forth. Such factors can affect which language variant may be most appropriate for communicating with a particular vehicle occupant. In accordance with example embodiments of the invention, a particular language variant may be more appropriate for communicating with a particular vehicle occupant if that language variant is more preferred by the vehicle occupant, if that language variant ensures better comprehension by the vehicle occupant, and so forth.

The inability of conventional smart vehicle technologies to respond to dynamically changing conditions that may impact which language variant may be most appropriate for communicating with a particular vehicle occupant creates a technical problem relating to in-vehicle communication, particularly in connection with autonomous/driverless vehicles, for which communication between occupant and vehicle is frequent and crucial to safe and effective vehicle operation. This technical problem can become particularly exacerbated in the case of autonomous ride-sharing and taxi vehicles for which there is a constant turnover of vehicle occupants who may speak a myriad of different language variants.

Example embodiments of the invention provide a technical solution to the aforementioned technical problem by providing computer-implemented methods, systems, and computer-readable media for determining and selecting a language variant for use in communicating vehicle output to a vehicle occupant, where such a language variant is identified based on dynamically changing factors/conditions such as characteristics of the vehicle occupant and/or language characteristics associated with the vehicle's dynamically changing location. For instance, in example embodiments, a language variant used for in-vehicle communication may be selected based on its association with a particular geographic region that includes a current location of the vehicle. More specifically, in example embodiments, a vehicle occupant may enter a vehicle such as an autonomous ride-sharing vehicle or taxi at a particular vehicle location. The vehicle occupant may be a new user of an application service offered in connection with the vehicle's operation (e.g., a ride-sharing app), and as such, there may be no pre-existing user profile for the vehicle occupant or any existing user profile may provide only limited information about the user. Thus, the application service provider may have no knowledge regarding a preferred language variant for the user or any knowledge regarding levels of comprehension of different language variants.

In such example embodiments, location data may be evaluated to determine a current location of the vehicle. The current location of the vehicle may be a location at which the vehicle occupant entered the vehicle or any location within a predetermined radius or distance from such a location. Map data may then be accessed to determine a geographic region/sub-region that encompasses the vehicle location. The geographic region/sub-regions may be delineated based on pre-existing knowledge regarding which language variants are associated with which geographic regions/sub-regions. A language variant may be deemed to be associated with a geographic region/sub-region if the language variant is spoken/understood by more than a threshold number of individuals residing in the region/sub-region; if at least a plurality of individuals residing in the region/sub-region consider the language variant to be a primary language variant; if the language variant is historically linked to the region/sub-region; and so forth.

In example embodiments, geographic map data may be accessed to determine a geographic region/sub-region that includes the current vehicle location. Then, language map data that stores associations between language variants and geographic regions/sub-regions may be accessed to determine which language variant is associated with the geographic region/sub-region that encompasses the current vehicle location. That language variant may then be selected for vehicle output. In some example embodiments, the vehicle location may be periodically re-determined as the vehicle traverses a navigation path/route. The periodically re-determined vehicle location may be evaluated against the geographic map data to determine if the vehicle has crossed over into a new geographic region/sub-region. If this is the case, if a new language variant is associated with the new geographic region (as determinable from the language map data), then the new language variant may be used for future vehicle output. In some example embodiments, the new language variant is only used for in-vehicle communication with a vehicle occupant that enters the vehicle within the geographic region/sub-region that the new language variant is associated with. That is, for in-vehicle communication with an existing vehicle occupant that entered the vehicle in a prior geographic region/sub-region, the prior language variant may continue to be used.

In the above manner, in-vehicle communication may occur using a local language variant associated with the vehicle's current location. This provides a technical solution to the technical problem of impaired vehicle-to-occupant communication that occurs in scenarios in which a vehicle occupant has no known user profile or language preference. In particular, there is an increased likelihood that the occupant speaks/comprehends a language variant widely used in the geographic region/sub-region in which the occupant entered the vehicle, and thus, by dynamically selecting such a language variant based on dynamically changing conditions such as the vehicle location, example embodiments of the invention provide the technical solution of a decreased likelihood of impaired vehicle-to-occupant communication. This technical solution provides a technological improvement over conventional smart vehicle technologies.

Further, in example embodiments, sensor data may be collected and analyzed to generate feedback data indicative of a sentiment of a vehicle occupant to a particular language variant being used for in-vehicle communication. The sensor data may be captured by any of a variety of types of sensors within the vehicle including, without limitation, cameras, microphones, vibration sensors, and so forth. Evaluating the sensor data to generate feedback data may include, for example, analyzing the sensor data to look for indications (or lack thereof) of negative sentiment of the occupant towards the language variant being used (e.g., difficulty or frustration comprehending the language variant) and/or indications of positive sentiment on the part of the occupant towards the language variant. The feedback data may then be evaluated to determine whether to retain the current language variant or select another language variant for in-vehicle communication.

For instance, in some example embodiments, a quantitative metric/value representing an overall level of sentiment of the vehicle occupant to the current language variant may be generated from the feedback data. This value may be compared against a threshold value to determine whether the current language variant should be switched to another language variant. In some example embodiments, if a decision to switch is made, the new language variant that is selected may be another language variant that is perhaps secondarily associated with the geographic region/sub-region that the current language variant is associated with. For example, the current language variant may have the largest number of speakers in the geographic region/sub-region in which the vehicle occupant entered the vehicle, whereas the language variant selected for the switch may have the second largest number of speakers in that geographic region/sub-region.

As another non-limiting example, the new language variant that is selected may be one that is associated with one or more neighboring geographic regions/sub-regions to the geographic region/sub-region that the current language variant is associated with. In yet other example embodiments, if a user profile exists for the vehicle occupant, the new language variant that is selected may be one identified in the user profile or one that is related to a language variant identified in the profile. As yet another non-limiting example, if the vehicle has entered a new geographic region/sub-region different from the one in which the vehicle occupant entered the vehicle, a new language variant associated with this new region may be selected for in-vehicle communication. Further, in example embodiments, an existing user profile for a vehicle occupant (or a newly created profile) may be updated with data/metadata indicative of the occupant's sentiment to the current language variant. This information can then be used to inform future decisions regarding selection of language variants for the same vehicle occupant.

As noted above, example embodiments of the invention provide the capability to generate feedback data from sensor data and evaluate the feedback data to determine a sentiment level of a vehicle occupant to a language variant, and to take one or more actions in response thereto such as retaining or changing the selected language variant based on the sentiment level; updating a user profile of the occupant to indicate the sentiment level for the particular language variant; and so forth. This serves as a quality control mechanism that enables the vehicle to learn about the language preferences of vehicle occupants over time to both ensure that a language variant is not used for a vehicle occupant who has a negative sentiment towards the language variant (e.g., a new user for whom there is no user profile yet or a user profile with limited information) and that new language variants that an existing user has a positive sentiment towards (and which was previously unknown) are identified such that they can be used for future in-vehicle communication with the vehicle occupant. Thus, example embodiments of the invention provide the additional technical solution of being able to adaptively learn vehicle occupants' language preferences. This technical solution solves a technical problem that arises, for example, in connection with new users with no known language preferences, of potentially using language variants that the users have a negative sentiment towards. This technical solution also solves the technical problem that conventional smart vehicle technologies suffer from of not being able to identify language variants that users have a positive sentiment towards in the absence of direct user feedback.

ILLUSTRATIVE EMBODIMENTS

Various illustrative embodiments of the invention will now be described in connection with the various Figures. Referring first to FIG. 1, an example geographic region 102 is depicted. The geographic region 102 may encompass any number of delineated sub-regions, of which sub-regions 104A, 104B, and 104C are illustratively shown. In example embodiments, the geographic region 102 may encompass a multitude of language variants such as multiple languages, multiple dialects of a same language, a respective multiple dialects for multiple languages, multiple accents corresponding to the same language or dialect, or the like. Similarly, each geographic sub-region (e.g., sub-regions 104A, 104B, 104C) may be associated with a respective language variant (e.g., a respective language, dialect, accent, etc.). For instance, in an example embodiment, the geographic region 102 is associated with a particular language, and each of the geographic sub-regions 104A, 104B, and 104C is associated with a respective dialect of that language. The geographic region 102 may have any geographic scope or size and may be, for example, a municipality; a county; a state or province; a collection of counties/states/provinces; a country; a continent; or any portions thereof. Similarly, each geographic sub-region may encompass an area of any scope or size within the geographic region 102 such as, for example, a neighborhood; a collection of adjacent neighborhoods; a municipality; a county; a state or province; or any portions thereof.

It should be appreciated that the above examples are merely illustrative and not exhaustive. For instance, in some example embodiments, multiple language variants may be associated with a given region/sub-region. For example, if each of multiple dialects are spoken/understood by at least a threshold number of people in geographic sub-region 104A, then each such dialect may be associated with the sub-region 104A. In scenarios in which multiple language variants are associated with a given sub-region (e.g., sub-region 104A), a ranking may be assigned to the language variants to indicate the preferred order in which they should be selected for in-vehicle communication. In some example embodiments, the ranking may be based on how widely spoken each language variant is within the given sub-region.

A vehicle 106 is further depicted in FIG. 1. The vehicle 106 may be any type of vehicle adapted for travel on land such as a vehicle with 2 axles (e.g., a car, a truck, etc.); a vehicle with more than 2 axles (e.g., a tractor trailer); an armored vehicle; or the like. The vehicle 106 may be an autonomous/driverless vehicle capable of operating completely independently of a human operator; a vehicle that has semi-autonomous capabilities but that still requires some input from a human operator; a human-operated vehicle; or the like. The vehicle 106 may include one or more on-board computers configured to provide in-vehicle communication in accordance with example embodiments of the disclosure. For example, an electronic control unit (ECC) or the like of the vehicle 106 may be configured to provide smart vehicle technology for adaptively selecting a language variant for in-vehicle communication based on dynamically changing conditions such as a location of the vehicle 106 (e.g., a vehicle location at which or near which a vehicle occupant enters the vehicle 106).

In example embodiments, the vehicle 106 may travel along a travel path 108. The travel path 108 may be a user-specified navigation route. The travel path 108 may traverse multiple different geographic sub-regions within the geographic region 102. For example, the vehicle 106 is illustratively depicted in FIG. 1 as traversing geographic sub-regions 104A, 104B, and 104C. Each such geographic sub-region 104A, 104B, and 104C may be associated with a different respective language variant, such as a different dialect of the same language. As will be described in more detail in reference to later Figures, in some example embodiments, the vehicle 106 may be operated in connection with a transportation application such as a ride-sharing app, such that multiple vehicle occupants enter and exit the vehicle 106 as it traverses the travel path 108. In some example embodiments, a language variant (e.g., a dialect) may be selected for in-vehicle communication based on its association with a geographic sub-region that includes a current vehicle location. More specifically, in some example embodiments, a language variant associated with a geographic sub-region in which a vehicle occupant first enters the vehicle 106 may be chosen for in-vehicle communication with the vehicle occupant, particularly in scenarios in which the vehicle occupant is a new user for whom there is no user profile or only a limited user profile that fails to indicate language preferences.

For instance, a vehicle occupant having no known language preference (occupant A) may enter the vehicle 106 at a location within the geographic sub-region 104A, in which case, a language variant associated with the geographic sub-region 104A may be selected for in-vehicle communication with occupant A. Then, as the vehicle traverses the travel path 108, it may leave sub-region 104A and enter sub-region 104B. Another vehicle occupant having no known language preference (occupant B) may enter the vehicle 106 at a location within the sub-region 104B, in which case, a new language variant (e.g., one associated with sub-region 104B) may be selected for in-vehicle communication with occupant B. In some example embodiments, the prior language variant may continue to be used for communication with occupant A. In other example embodiments, the new language variant may be used for communication with occupant A as well as occupant B. In yet other example embodiments, the prior language variant may be used for in-vehicle communication with occupant B based on its prior use for communication with occupant A and despite occupant B entering the vehicle 106 in a different sub-region (e.g., sub-region 104B). This dynamic selection of a language variant to use for in-vehicle communication based on geographic region/sub-region and vehicle location will be described in more detail hereinafter in reference to FIG. 2.

Figure 2:
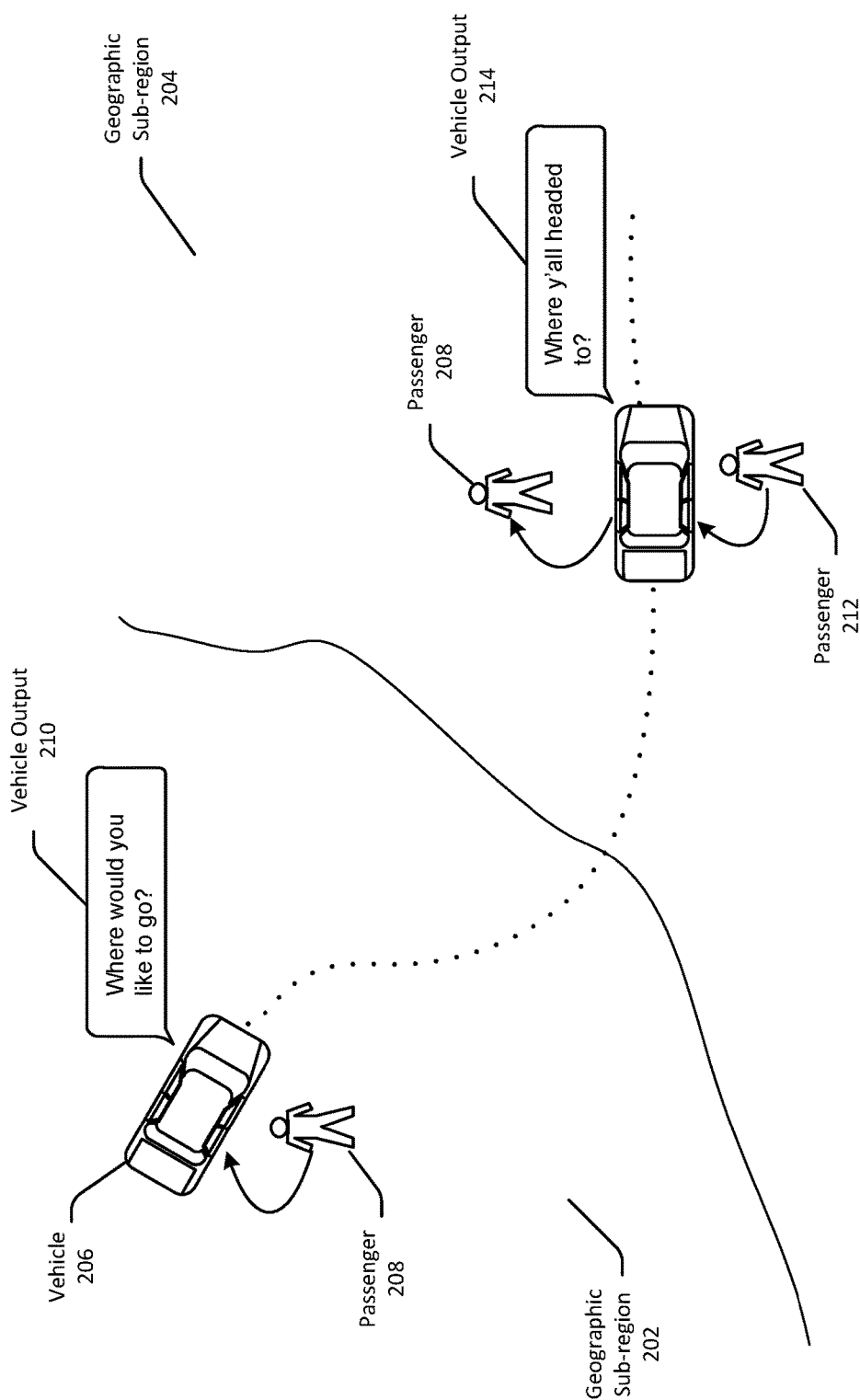
FIG. 2 illustrates selection of a language variant for vehicle output based on an association with the geographic sub-region that includes a vehicle's current location in accordance with an example embodiment of the invention.

FIG. 2 illustrates selection of a language variant for vehicle output based on an association with the geographic sub-region that includes a vehicle's current location in accordance with an example embodiment of the invention. As depicted in FIG. 2, a vehicle 206 (which may represent vehicle 106 of FIG. 1 for example) may be travelling along a travel path. The vehicle 206 may be, for example, operated in connection with a ride-sharing service such that multiple vehicle occupants may enter and exit the vehicle 206 as the vehicle 206 travels along its travel path.

In example embodiments, the vehicle's 206 travel path may traverse multiple geographic regions/sub-regions. For instance, the vehicle 206 may traverse at least a portion of a geographic sub-region 202 and at least a portion of a geographic sub-region 204. In example embodiments, the geographic sub-region 202 and the geographic sub-region 204 may represent a pairing of adjacent geographic sub-regions from FIG. 1 (e.g., geographic sub-regions 104A, 104B). In example embodiments, the geographic sub-region 202 and the geographic sub-region 204 may each be associated with different respective language variants. For example, the geographic sub-region 202 is illustratively shown as being associated with a particular dialect of the English language (e.g., a generic American dialect), while the geographic sub-region 204 is illustratively shown as being associated with another English-language dialect (e.g., a Southern United States dialect). The example switch in dialects shown in FIG. 2 may occur, for example, if the vehicle 206 was crossing from a Midwestern state to a Southern state. It should be appreciated that while a particular language variant (e.g., a particular dialect) is being described as being primarily linked to each geographic sub-region, multiple language variants may be associated with any given geographic sub-region and ranked to indicate their degree of association with the sub-region.

In an example embodiment, a vehicle occupant 208 having no known language preference may enter the vehicle 206 at a location within the geographic sub-region 202, in which case, a language variant associated with the geographic sub-region 202 may be selected for providing vehicle output 210 to the occupant 208. More specifically, at or within a predetermined radius of the location at which occupant 208 enters vehicle 206, a determination may be made as to which sub-region includes the current location of the vehicle 206. In the example shown in FIG. 2, after occupant 208 enters the vehicle 206, it may be determined that the occupant 208 has been picked up in geographic sub-region 202. Then, language map data may be accessed to identify a language variant associated with the geographic sub-region 202.

A primary language variant corresponding to the sub-region 202 may be selected for the vehicle output 210. In some example embodiments, a check may first be performed to determine whether the occupant 208 has an existing user profile that indicates a language preference. In some example embodiments, the language variant local to the geographic sub-region in which the occupant 208 entered the vehicle 206 may be used for the vehicle output 210 only if there is no user profile for the occupant 208 or any such user profile does not indicate a language preference. In other example embodiments, even if a user profile for the occupant 208 indicates a language preference, the language variant local to the geographic sub-region in which the occupant 208 entered the vehicle 206 (e.g., sub-region 202) may be used for the vehicle output 210 even if it differs from the preferred language as long the occupant's 208 user profile indicates that the occupant 208 would comprehend the local language variant. For example, if the occupant's 208 user profile indicates a preferred language but no preferred dialect, the dialect local to sub-region 202 may be used. As another non-limiting example, even if the occupant's 208 user profile indicates a preferred language and dialect, another dialect local to the sub-region 202 may be used for the vehicle output 210 as long as the occupant 208 is likely to correspond the local dialect.

Referring again to FIG. 2, as the vehicle 206 traverses its travel path, it may leave sub-region 202 and enter sub-region 204. The occupant 208 may exit the vehicle 206 and a new occupant 212 may enter the vehicle 206. While the occupant 208 is illustratively shown as exiting the vehicle 206 after the vehicle 206 enters the sub-region 204, it should be appreciated that the occupant 208 may exit the vehicle 206 while it is still in sub-region 202 or may not exit the vehicle 206 prior to the occupant 212 entering the vehicle. More specifically, at or within a predetermined radius of the location at which occupant 212 enters vehicle 206, a determination may be made as to which sub-region includes the current location of the vehicle 206. In the example shown in FIG. 2, after occupant 212 enters the vehicle 206, it may be determined that the occupant 212 has been picked up in geographic sub-region 204. Then, language map data may be accessed to identify a language variant associated with the geographic sub-region 204, and this language variant may be used for vehicle output 214 to the occupant 212. For example, FIG. 2, illustratively depicts a different American dialect being associated with sub-region 204 as compared to sub-region 202, and the dialect associated with sub-region 204 being selected for the vehicle output 214 to the occupant 212.

As previously noted, in some example embodiments, the prior occupant 208 may not exit the vehicle 206 prior to the occupant 212 entering the vehicle 206. In such example embodiments, the prior language variant being used for the occupant 208 may continue to be used for the occupant 208 even after entering the different sub-region 204 and the occupant 212 entering the vehicle 206. In some example embodiments, the prior language variant may be used for communication with the occupant 208 while the new language variant associated with the sub-region 204 may be used for communication with the occupant 212. An identifier such as the occupant's name can be used to identify the individual to whom the communication is directed. In other example embodiments, the prior language variant may be used for all in-vehicle communication including communication with the occupant 212 or the new language variant may be used for all in-vehicle communication including with the occupant 208.

In some example embodiments, two or more geographic sub-regions may overlap at least partially, in which case, multiple language variants may be associated with locations that fall within the areas of overlap. For example, geographic sub-region 202 and geographic sub-region 204 may have one or more areas of overlap. Locations that fall within an area of overlap may be associated with a language variant corresponding to the sub-region 202 and a language variant corresponding to the sub-region 204. For instance, a first dialect having the largest number of speakers across sub-region 202 and a second dialect having the largest number of speakers across sub-region 204 may have a roughly equal number of speakers within the area of overlap between sub-region 202 and sub-region 204. This is commonly seen in border areas of adjacent regions such as adjacent states in a country.

In such example embodiments, a decision needs to be made regarding which language variant to select for vehicle output to a vehicle occupant who potentially enters the vehicle at a location within the area of overlap of the sub-region 202 and the sub-region 204. In some example embodiments, if the user's profile indicates a preferred language variant, the language variant that is most similar to the user's preferred language variant may be selected from the respective language variants associated with sub-regions 402, 404 (if the preferred language variant is not itself being selected for some other reason such as a desire to obtain user sentiment data). In other example embodiments, one of the language variants associated with the sub-regions 402, 404 may be selected randomly. In yet other example embodiments, the vehicle 206 may alternate between the language variants when presenting vehicle output.

For instance, the vehicle may initially provide vehicle output in a language variant corresponding to the sub-region 402, but may then switch to the language variant corresponding to the sub-region 404 after a predetermined amount of time has elapsed. The vehicle may continue alternating between the language variants in this fashion until, for example, the vehicle 206 exits the overlapping area, at which point, the language variant corresponding to the sub-region in which the vehicle is now exclusively located may be used for future vehicle output. Alternatively, the vehicle 206 may continue switching between the language variants until enough user sentiment data is acquired to make a determination that the user has greater positive sentiment towards a particular language variant, at which point, that language variant may be selected for future vehicle output.

In some example embodiments, the decision as to which language variant to use for vehicle output when multiple languages are roughly equally associated with an overlapping area of multiple geographic sub-regions may be based on a navigation route of the vehicle. In some example embodiments, the sub-region towards which the vehicle is moving may determine the language variant that is used. For example, if the vehicle 206 is moving away from the sub-region 402 and further towards the sub-region 404 as it traverse the area of overlap, the vehicle 206 may select the language variant associated with the sub-region 404 for the vehicle output because the vehicle may soon be exclusively within the sub-region 404. As yet another non-limiting example, the vehicle 206 may select the language variant corresponding to the sub-region whose center is closest to the vehicle at the time of vehicle output. It should be appreciated that the above examples are merely illustrative and not exclusive.

Figure 3:
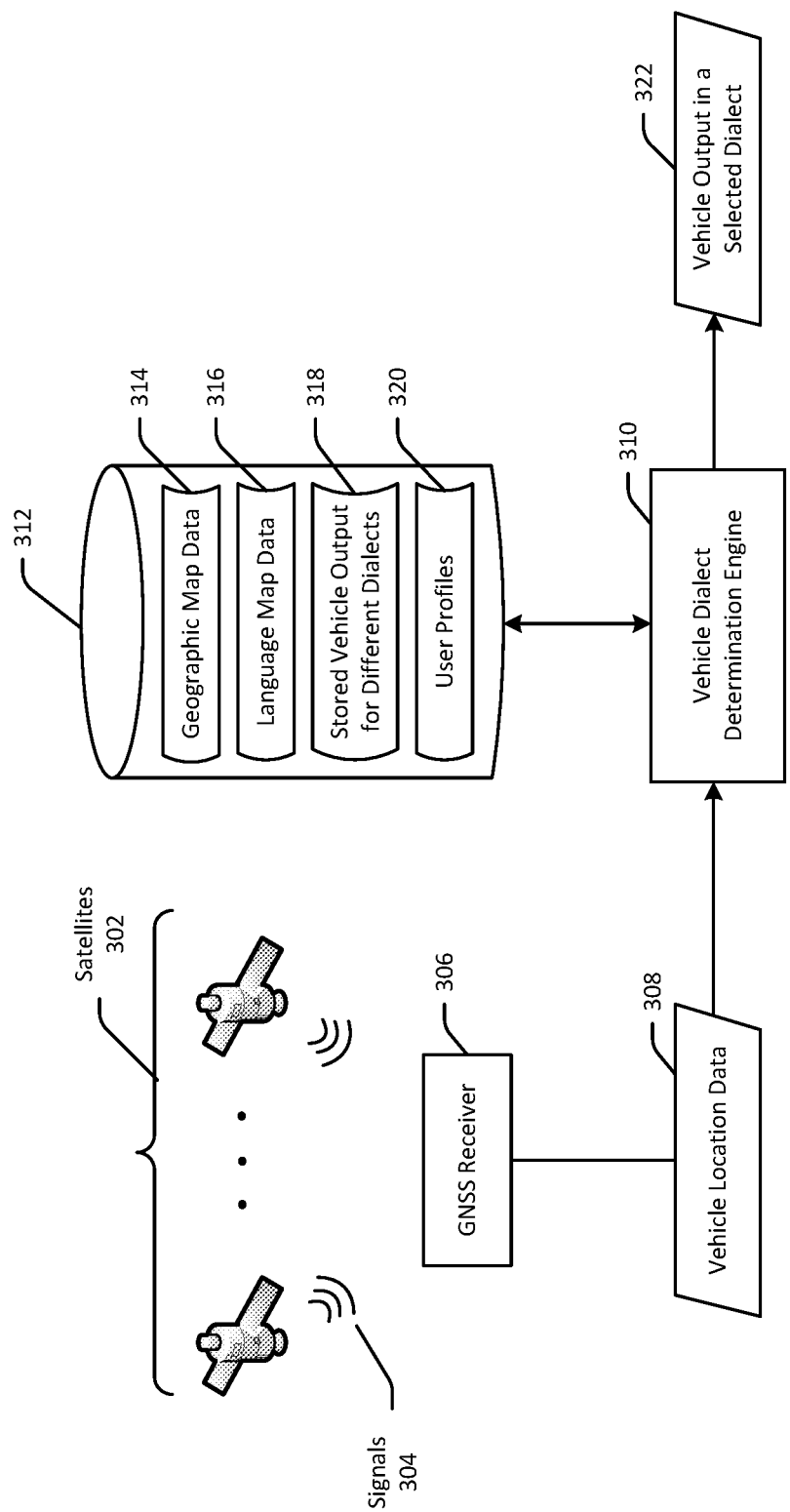
FIG. 3 is a data flow and block diagram schematically illustrating the determination and selection of a language variant for vehicle output based on an association with the geographic sub-region that includes a vehicle's current location in accordance with an example embodiment of the invention.
Figure 5:
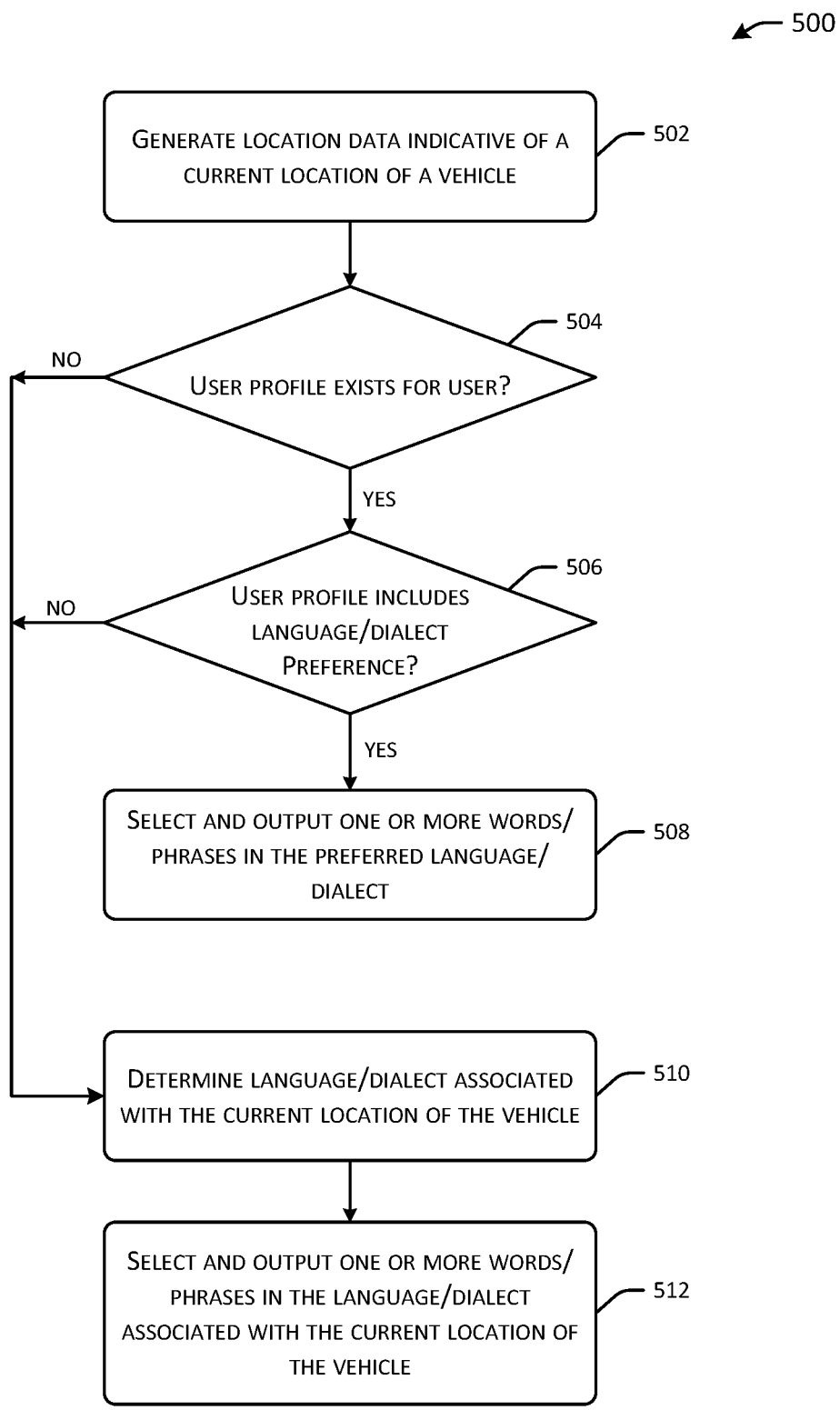
FIG. 5 is a process flow diagram of an illustrative method for determining and selecting a language variant for vehicle output based on an association with the geographic sub-region that includes a vehicle's current location in accordance with an example embodiment of the invention.

FIG. 3 is a data flow and block diagram schematically illustrating the determination and selection of a language variant for vehicle output based on an association with the geographic sub-region that includes a vehicle's current location in accordance with an example embodiment of the invention. FIG. 5 is a process flow diagram of an illustrative method 500 for determining and selecting a language variant for vehicle output based on an association with the geographic sub-region that includes a vehicle's current location in accordance with an example embodiment of the invention. FIGS. 3 and 5 will be described in conjunction with one another hereinafter.

Each operation of the method 500 and/or the method 600 (which will be described later in this disclosure) can be performed by one or more of the engines/program modules depicted in FIG. 1 or 7, whose operation will be described in more detail hereinafter. These engines/program modules can be implemented in any combination of hardware, software, and/or firmware. In certain example embodiments, one or more of these engines/program modules can be implemented, at least in part, as software and/or firmware modules that include computer-executable instructions that when executed by a processing circuit cause one or more operations to be performed. In example embodiments, these engines/program modules may be customized computer-executable logic implemented within a customized computing machine such as a customized FPGA or ASIC. A system or device described herein as being configured to implement example embodiments of the invention can include one or more processing circuits, each of which can include one or more processing units or cores. Computer-executable instructions can include computer-executable program code that when executed by a processing core can cause input data contained in or referenced by the computer-executable program code to be accessed and processed by the processing core to yield output data.

Referring now to FIG. 5 in conjunction with FIG. 3, at block 502 of the method 500, location data 308 indicative of a current location of a vehicle may be generated. In example embodiments, a Global Navigation Satellite System (GNSS) receiver 306 may be provided. The GNSS receiver 306 may be configured to receive satellite signals 304 from a constellation of satellites 302 located in space. The signals 304 may include positioning and timing data, which the GNSS receiver 306 can use to determine location. The GNSS receiver 306 may be provided in a vehicle (e.g., vehicle 106, vehicle 206). The GNSS receiver 306 may operate in accordance with any of a variety of satellite systems that provide global coverage including, without limitation, Europe's Galileo, the United States' Global Positioning System (GPS), Russia's GLONASS, or China's BeiDou Navigation Satellite System. In example embodiments, the GNSS receiver 306 may continuously receive the satellite signals 304 and may continuously or periodically generate the location data 308 by calculating the receiver's 306 location (and thus the location of the vehicle in which it is provided) from the positioning and timing data included in the received signals 304.

As previously described, in some example embodiments, the vehicle may be operated in connection with a ride-sharing or taxi service according to which multiple vehicle occupants enter and exit the vehicle over a period of time. At some point during vehicle operation, a vehicle occupant (e.g., occupant 208 of FIG. 2) may enter the vehicle. At block 504 of the method 500, a check may be performed to determine whether a user profile exists for the new occupant. In some example embodiments, this check may be performed by accessing one or more datastores 312 that store a set of user profiles 320. Various identifying information for the new vehicle occupant (e.g., name, DOB, biometrics, etc.) may be compared against corresponding stored information to determine if there is stored matching user profile. In response to a positive determination at block 504, which indicates that the new occupant is a known user (e.g., has already established an account with the ride-sharing/taxi service provider), the method 500 may proceed to block 506, where a check may be performed to determine whether the user profile specifies a preference for a particular language variant. A language variant preference may be a preferred language, a preferred dialect, a preferred accent, or any combination thereof.

In some example embodiments, in response to a positive determination at block 506 indicating that the user profile does indicate a language variant preference, the method 500 may proceed to block 508, where a vehicle dialect determination engine 310 may select and present vehicle output 322 using the preferred language variant. More specifically, the engine 310 may access one or more datastores 312 to retrieve the portion of the stored vehicle output 318 that corresponds to the preferred language variant. For instance, the engine 310 may access the datastore(s) 312 to retrieve one or more words or phrases that are then outputted in audible or written form in the preferred language/dialect indicated in the user profile. It should be appreciated that while the engine 310 is referred to herein as a "dialect" determination engine, it should be appreciated that it may select output in other suitable language variants including any of those previously described.

On the other hand, in response to a negative determination at block 504 or at block 506, the method 500 may proceed to block 510, where the engine 310 may determine a language variant associated with a current location of the vehicle. More specifically, at or within a predetermined radius of the location at which the occupant entered the vehicle (and for whom there is no user profile that indicates a language preference for the occupant), the engine 310 may determine which geographic sub-region includes the current location of the vehicle. In particular, in example embodiments, the engine 310 receives the location data 308 indicative of the vehicle's current calculated location and accesses geographic map data 314 stored in the datastore(s) 312 to determine which delineated geographic sub-region includes the vehicle location. Then, the engine 310 may access language map data 316 stored in the datastore(s) 312 to determine which language variant corresponds to that geographic sub-region.

Then, at block 512 of the method 500, the engine 310 may select a portion of the stored vehicle output 318 that is in the language variant corresponding to the geographic sub-region that includes the current vehicle location, and the engine 310 may present the selected portion of the vehicle output 318 as vehicle output 322. For instance, the engine 310 may select one or more words or phrases in the identified language variant from the vehicle output 318 and present them audibly or visually to the vehicle occupant as the vehicle output 322.

It should be appreciated that embodiments of the invention also include a number of variations of the method 500. For instance, the example method 500 can be modified to include any of the various alternative aspects described earlier for handling scenarios involving multiple simultaneous vehicle occupants, who potentially entered the vehicle at different locations in geographic regions/sub-regions corresponding to different language variants. More specifically, any of the previously described approaches for selecting and present vehicle output in one or more language variants to multiple vehicle occupants can be employed.

In addition, in some example embodiments, even if a vehicle occupant has a known user profile that specifies a language variant preference, a language variant corresponding to the geographic sub-region that includes the vehicle's current location and/or the location at which the occupant entered the vehicle may nonetheless be selected for vehicle output to the occupant. The objective of doing so may be to gather feedback data (as will be described in more detail later in this disclosure in reference to FIG. 6) indicative of the vehicle occupant's sentiment towards the local language variant.

For instance, the user profile for the vehicle occupant may specify a language variant preference for a particular dialect of a language. Nonetheless, a different dialect (e.g., a dialect local to a neighboring sub-region to a sub-region associated with the preferred dialect) may be selected for vehicle output to the occupant in order to gather user sentiment data for the selected dialect. As another non-limiting example, a user profile for the occupant may simply specify a preferred language, but may indicate no preference for any given dialect. In such example scenarios, it may be desirable to test the occupant's sentiment towards different dialects (rather than merely present output in a default generic dialect). The objective of presenting vehicle output in a particular language variant (e.g., a dialect) that is different from a preferred language variant (e.g., dialect) indicated in a user's profile or in the absence of more specific information regarding language variant preference in the user's profile may be to gather sentiment data that can be used to inform future decisions as to which language variant to use for providing vehicle output to the occupant.

Figure 4:
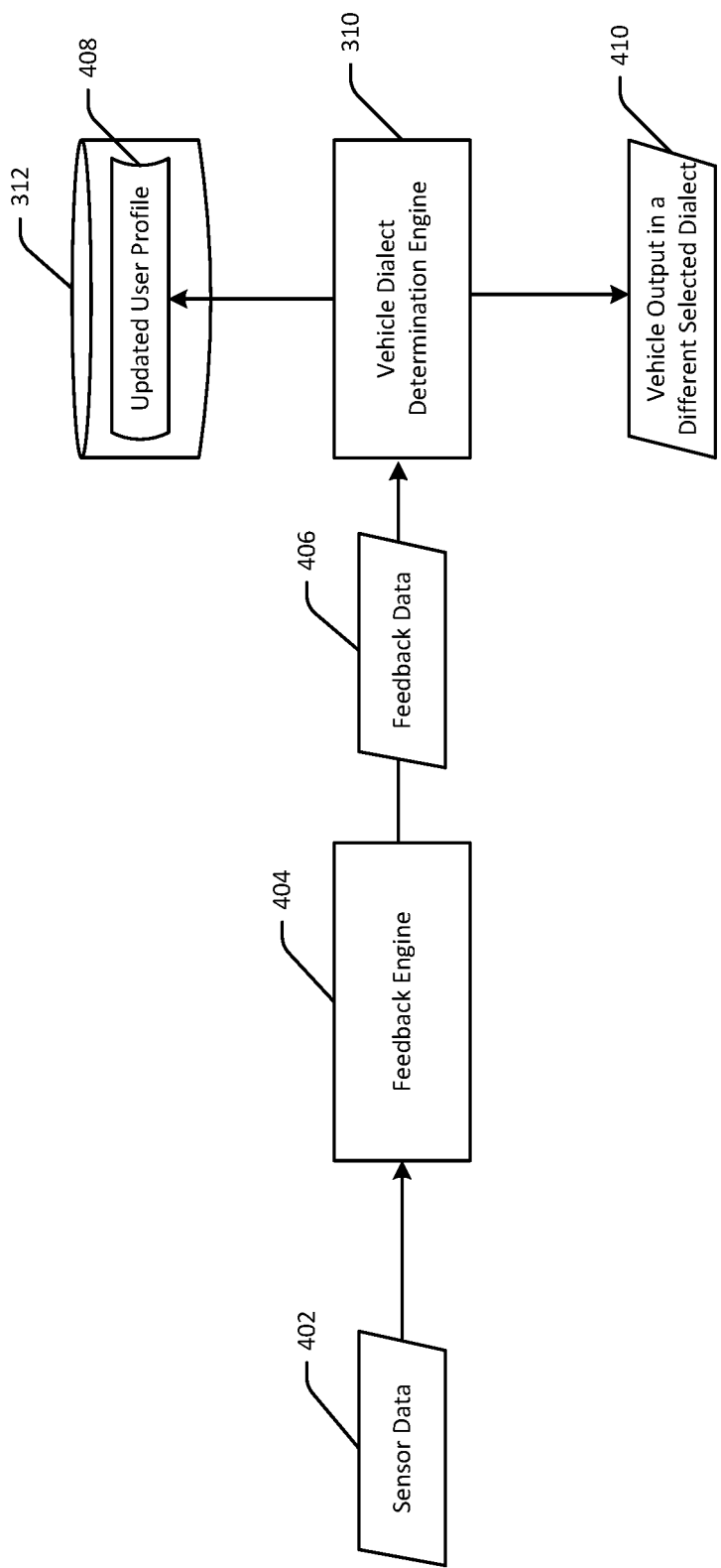
FIG. 4 is a data flow and block diagram schematically illustrating changing a language variant being used for vehicle output based on feedback data indicating a vehicle occupant's sentiment towards the current language variant in accordance with an example embodiment of the invention.
Figure 6:
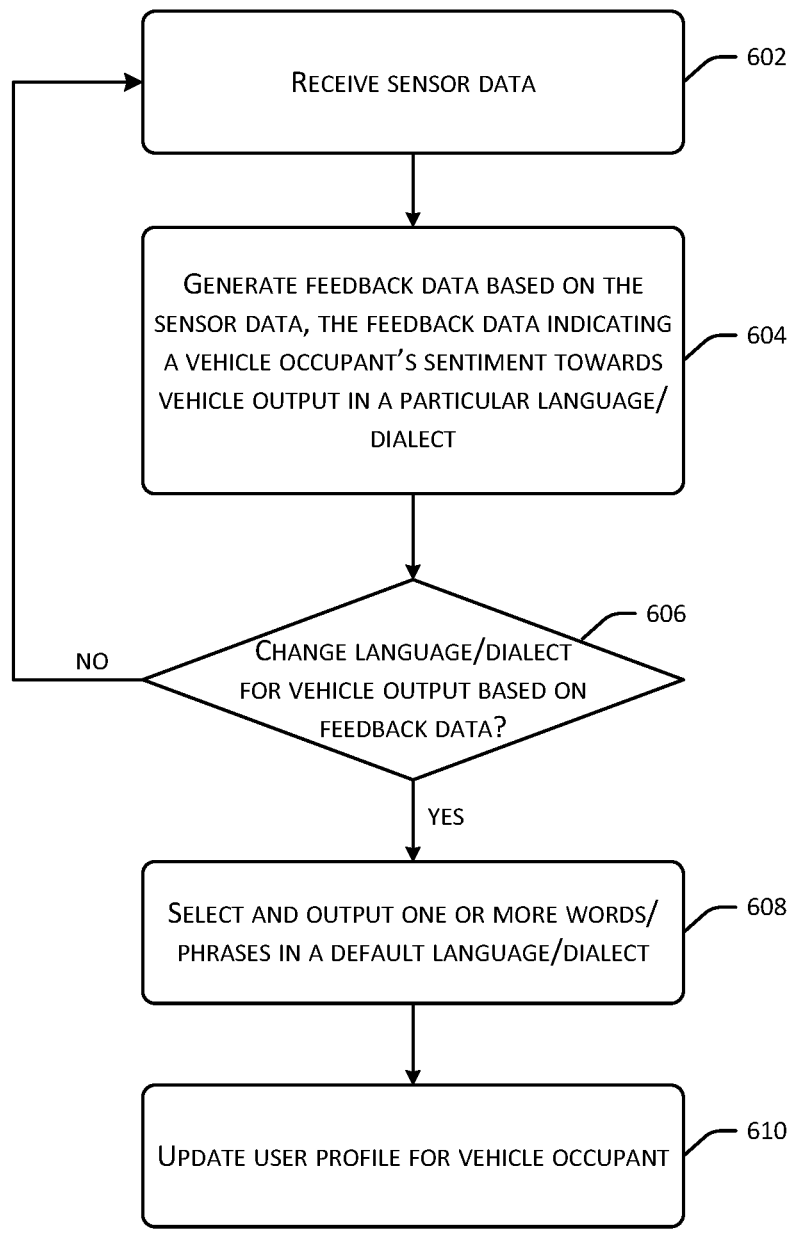
FIG. 6 is a process flow diagram of an illustrative method for changing a language variant being used for vehicle output based on feedback data indicating a vehicle occupant's sentiment towards the current language variant in accordance with an example embodiment of the invention.

FIG. 4 is a data flow and block diagram schematically illustrating changing a language variant being used for vehicle output based on feedback data indicating a vehicle occupant's sentiment towards the current language variant in accordance with an example embodiment of the invention. FIG. 6 is a process flow diagram of an illustrative method 600 for changing a language variant being used for vehicle output based on feedback data indicating a vehicle occupant's sentiment towards the current language variant in accordance with an example embodiment of the invention. FIGS. 4 and 6 will be described in conjunction with one another hereinafter.

At block 602 of the method 600, sensor data 402 may be received by a feedback engine 404. The sensor data 402 may be captured by any of a variety of types of sensors within a vehicle including, without limitation, cameras, microphones, vibration sensors, and so forth. In general, a vehicle (e.g., an autonomous vehicle, a driverless vehicle, etc.) can have a myriad of onboard sensors. Such sensors can be disposed on an exterior or in an interior of a vehicle and can include, without limitation, LiDAR sensors, radars, cameras, GPS receivers, sonar-based sensors, ultrasonic sensors, IMUs, accelerometers, gyroscopes, magnetometers, FIR sensors, and so forth. Such sensors play a central role in the functioning and operation of an autonomous or driverless vehicle. For example, LiDARs can be utilized to detect objects (e.g., other vehicles, road signs, pedestrians, buildings, etc.) in an environment around a vehicle. LiDARs can also be utilized to determine relative distances between objects in the environment and between objects and the vehicle. As another non-limiting example, radars can be utilized in connection with collision avoidance, adaptive cruise control, blind spot detection, assisted parking, and other vehicle applications. As yet another non-limiting example, cameras can be utilized to recognize, interpret, and/or identify objects captured in images or visual cues of the objects. Data collected from these sensors can be processed and used, as inputs, to algorithms configured to make various autonomous driving decisions including decisions relating to when and how much to accelerate, decelerate, change direction, or the like. In example embodiments, at least a portion of the sensor data collected by these existing sensors provided with autonomous vehicles may be used to perform the user sentiment analysis described herein.

At block 604 of the method 600, the feedback engine 404 may analyze the sensor data 402 to generate feedback data 406 indicative of a sentiment of a vehicle occupant in the vehicle (e.g., occupant 208 in vehicle 206, FIG. 2) to a particular language variant being used for in-vehicle communication. Evaluating the sensor data 402 to generate the feedback data 404 may include, for example, analyzing the sensor data 402 to look for indications (or lack thereof) of negative sentiment of the occupant towards the language variant being used (e.g., difficulty or frustration comprehending the language variant) and/or indications of positive sentiment on the part of the occupant towards the language variant.

An example indication of a negative user sentiment of the occupant towards the language variant being used may be image data that shows the occupant engaging in behavior, mannerisms, body movements, or the like that are typically associated with a negative attitude towards a thing. Another example indication of negative sentiment may be occupant's speech or other audible sounds (e.g., a sighing noise) that indicate negative sentiment with the language variant. Similarly, the sensor data 402 may also be evaluated for any indications of positive sentiment towards the chosen language variant. Such indications may similarly take the form of occupant's body language, occupant's speech or other sounds, or the like.

In addition, various data may be collected and analyzed to determine if the occupant is having difficulty comprehending the language variant being used. Comprehension difficulty may be interpreted as a form of negative user sentiment. Similarly, the sensor data 402 may also be evaluated for indications that the occupant is having ease in comprehending the language variant. For example, the amount of time that elapses between providing vehicle output to the occupant and receiving a response from the occupant (if one is expected) may be determined. This elapsed time may be measured other multiple instances and some statistical measure (e.g., average, mode, median, etc.) may be determined. As another non-limiting example, the number of times the occupant asks the vehicle's system to clarify its output may be determined over some period of time.

In example embodiments, these various metrics may be aggregated/combined and potentially weighted with respective weights to obtain a quantitative metric/value representing an overall level of sentiment of the vehicle occupant to the current language variant. This overall quantitative metric may form part of the feedback data 406. In addition, other indications of user sentiment such as body language, mannerisms, and so forth, may be quantified and incorporated into the overall user sentiment metric. In some example embodiments, these other indications of user sentiment may be quantified using crowdsourced data. In other example embodiments, particular image data/audio data may be selected as baseline representations of negative or positive user sentiment. The feedback engine 404 may be configured to determine a degree of similarity between the sensor data 402 and such baseline data and generate corresponding quantitative values therefrom.

In example embodiments, the vehicle dialect determination engine 310 may evaluate the feedback data 406 at block 606 of the method 600 to determine whether to retain the current language variant or select another language variant for in-vehicle communication. In particular, in example embodiments, the engine 310 may, at block 606, compare the overall user sentiment metric against a threshold value to determine whether the current language variant should be switched to another language variant. If, for example, the overall user sentiment metric fails to satisfy the threshold value (which corresponds to a positive determination at block 606 and may involve the metric being less than the threshold value, equal to the threshold value, or greater than the threshold value depending on the implementation), the method 600 may proceed to block 608, where a different language variant may be selected for vehicle output.

In some example embodiments, the new language variant that is selected may be a default language variant such as a generic dialect of the same language. As another non-limiting example, the newly selected language variant may be another language variant that is perhaps secondarily associated with the geographic region/sub-region that the current language variant is associated with. For example, the current language variant may have the largest number of speakers in the geographic region/sub-region in which the vehicle occupant entered the vehicle, whereas the language variant selected for the switch may have the second largest number of speakers in that geographic region/sub-region.

As yet another non-limiting example, the new language variant that is selected may be one that is associated with one or more neighboring geographic regions/sub-regions to the geographic region/sub-region that the current language variant is associated with. In yet other example embodiments, if a user profile exists for the vehicle occupant, the new language variant that is selected may be one identified in the user profile or one that is related to a language variant identified in the profile. As yet another non-limiting example, if the vehicle has entered a new geographic region/sub-region different from the one in which the vehicle occupant entered the vehicle, a new language variant associated with this new region may be selected for in-vehicle communication.

Finally, at block 610 of the method 600, an existing user profile 408 for a vehicle occupant (or a newly created profile if one did not previously exist) may be updated with data/metadata indicative of the occupant's sentiment to the current language variant. This information can then be used to inform future decisions regarding selection of language variants for the same vehicle occupant. For example, the updated user profile 408 may be stored in the datastore(s) 312 and may include the overall user sentiment metric and/or any of the other metrics or other data indicative of the user sentiment analysis that was performed.

Hardware Implementation

Figure 7:
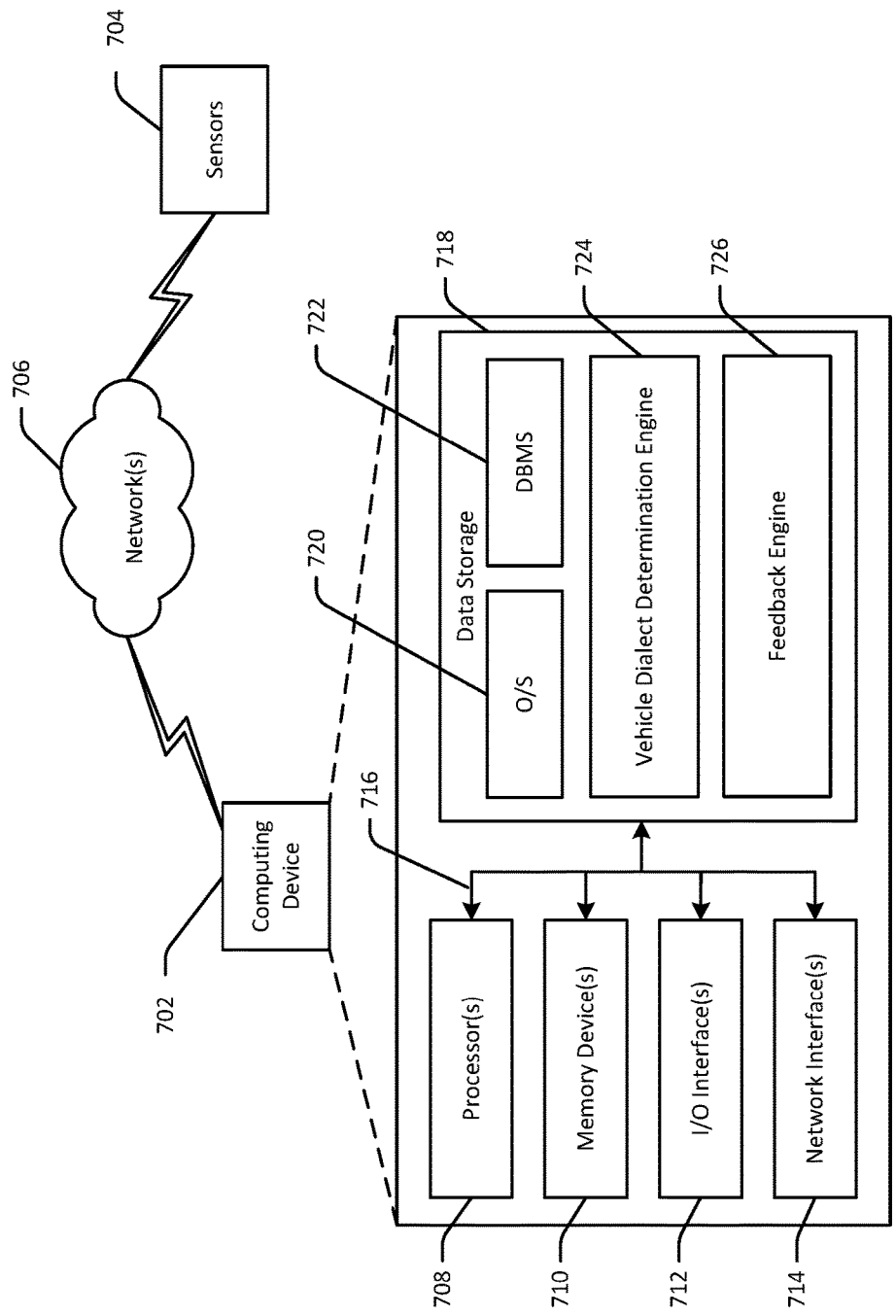
FIG. 7 is a schematic block diagram illustrating an example networked architecture configured to implement example embodiments of the invention.

FIG. 7 is a schematic block diagram illustrating an example networked architecture 700 configured to implement example embodiments of the invention. The networked architecture 700 can include one or more special-purpose computing devices 702 communicatively coupled via one or more networks 706 to various sensors 704. The sensors 704 may include any of the example types of on-board vehicle sensors previously described including, without limitation, LiDAR sensors (e.g. the LiDAR 104), radars, cameras, GPS receivers, sonar-based sensors, ultrasonic sensors, microphones, IMUs, accelerometers, gyroscopes, magnetometers, FIR sensors, and so forth. In example embodiments, the sensors 704 may include on-board sensors provided on an exterior or in an interior of a vehicle (e.g., vehicle 102) such as an autonomous vehicle. The special-purpose computing device(s) 702 may include devices that are integrated with a vehicle and may receive sensor data from the sensors 704 via a local network connection (e.g., WiFi, Bluetooth, Dedicated Short Range Communication (DSRC), or the like). In other example embodiments, the special-purpose computing device(s) 702 may be provided remotely from a vehicle and may receive the sensor data from the sensors 704 via one or more long-range networks.

The special-purpose computing device(s) 702 may be hard-wired to perform the techniques of example embodiments of the invention; may include circuitry or digital electronic devices such as one or more ASICs or FPGAs that are persistently programmed to perform the techniques; and/or may include one or more hardware processors programmed to perform the techniques pursuant to program instructions in firmware, memory, other storage, or a combination thereof. The special-purpose computing device(s) 702 may also combine custom hard-wired logic, ASICs, or FPGAs with custom programming to accomplish the techniques. The special-purpose computing device(s) 702 may be desktop computer systems, server computer systems, portable computer systems, handheld devices, networking devices or any other device or combination of devices that incorporate hard-wired and/or programmed logic to implement the techniques.

The special-purpose computing device(s) may be generally controlled and coordinated by operating system software 720, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device(s) 702 may be controlled by a proprietary operating system. The operating system software 720 may control and schedule computer processes for execution; perform memory management; provide file system, networking, and I/O services; and provide user interface functionality, such as a graphical user interface ("GUI").

While the computing device(s) 702 and/or the sensors 704 may be described herein in the singular, it should be appreciated that multiple instances of any such component can be provided and functionality described in connection any particular component can be distributed across multiple instances of such a component. In certain example embodiments, functionality described herein in connection with any given component of the architecture 700 can be distributed among multiple components of the architecture 700. For example, at least a portion of functionality described as being provided by a computing device 702 may be distributed among multiple such computing devices 702.

The network(s) 706 can include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. The network(s) 706 can have any suitable communication range associated therewith and can include, for example, global networks (e.g., the Internet), metropolitan area networks (MANs), wide area networks (WANs), local area networks (LANs), or personal area networks (PANs). In addition, the network(s) 706 can include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the computing device 702 can include one or more processors (processor(s)) 708, one or more memory devices 710 (generically referred to herein as memory 710), one or more input/output ("I/O") interface(s) 712, one or more network interfaces 717, and data storage 718. The computing device 702 can further include one or more buses 716 that functionally couple various components of the computing device 702. The data storage may store one or more engines, program modules, components, or the like including, without limitation, a vehicle dialect determination engine 724 and a feedback engine 726. Each of the engines/components depicted in FIG. 7 may include logic for performing any of the processes or tasks described earlier in connection with correspondingly named engines/components. In certain example embodiments, any of the depicted engines/components may be implemented in hard-wired circuitry within digital electronic devices such as one or more ASICs or FPGAs that are persistently programmed to perform corresponding techniques.

The bus(es) 716 can include at least one of a system bus, a memory bus, an address bus, or a message bus, and can permit the exchange of information (e.g., data (including computer-executable code), signaling, etc.) between various components of the computing device 702. The bus(es) 716 can include, without limitation, a memory bus or a memory controller, a peripheral bus, an accelerated graphics port, and so forth. The bus(es) 716 can be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 710 can include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, can include non-volatile memory. In certain example embodiments, volatile memory can enable faster read/write access than non-volatile memory. However, in certain other example embodiments, certain types of non-volatile memory (e.g., FRAM) can enable faster read/write access than certain types of volatile memory.

In various implementations, the memory 710 can include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 710 can include main memory as well as various forms of cache memory such as instruction cache(s), data cache(s), translation lookaside buffer(s) (TLBs), and so forth. Further, cache memory such as a data cache can be a multi-level cache organized as a hierarchy of one or more cache levels (L1, L2, etc.). In example embodiments, the memory 710 may include the data storage 106(1)-106(P) and/or the data storage 120 depicted in FIG. 1. Alternatively, the data storage 106(1)-106(P) may be hard disk storage forming part of the data storage 718 and/or the data storage 120 may be a form of RAM or cache memory that is provided as part of the FOV semantics computing machine 727 itself.

The data storage 718 can include removable storage and/or non-removable storage including, but not limited to, magnetic storage, optical disk storage, and/or tape storage. The data storage 718 can provide non-volatile storage of computer-executable instructions and other data. The memory 710 and the data storage 718, removable and/or non-removable, are examples of computer-readable storage media (CRSM) as that term is used herein. The data storage 718 can store computer-executable code, instructions, or the like that can be loadable into the memory 710 and executable by the processor(s) 708 to cause the processor(s) 708 to perform or initiate various operations. The data storage 718 can additionally store data that can be copied to memory 710 for use by the processor(s) 708 during the execution of the computer-executable instructions. Moreover, output data generated as a result of execution of the computer-executable instructions by the processor(s) 708 can be stored initially in memory 710 and can ultimately be copied to data storage 718 for non-volatile storage.

More specifically, the data storage 718 can store one or more operating systems (O/S) 720 and one or more database management systems (DBMS) 722 configured to access the memory 710 and/or one or more external datastore(s) (not depicted) potentially via one or more of the networks 706. In addition, the data storage 718 may further store one or more program modules, applications, engines, computer-executable code, scripts, or the like. For instance, any of the engines/components depicted in FIG. 7 may be implemented as software and/or firmware that includes computer-executable instructions (e.g., computer-executable program code) loadable into the memory 710 for execution by one or more of the processor(s) 708 to perform any of the techniques described herein.

Although not depicted in FIG. 7, the data storage 718 can further store various types of data utilized by engines/components of the computing device 702. Such data may include, without limitation, sensor data (e.g., point could data 112), downsampled data, data indicative of grid structures/grid characteristics, grid-based sensor data, or the like. Any data stored in the data storage 718 can be loaded into the memory 710 for use by the processor(s) 708 in executing computer-executable program code. In addition, any data stored in the data storage 718 can potentially be stored in one or more external datastores that are accessible via the DBMS 722 and loadable into the memory 710 for use by the processor(s) 708 in executing computer-executable instructions/program code.

The processor(s) 708 can be configured to access the memory 710 and execute computer-executable instructions/program code loaded therein. For example, the processor(s) 708 can be configured to execute computer-executable instructions/program code of the various engines/components of the computing device 702 to cause or facilitate various operations to be performed in accordance with one or more embodiments of the invention. The processor(s) 708 can include any suitable processing unit capable of accepting data as input, processing the input data in accordance with stored computer-executable instructions, and generating output data. The processor(s) 708 can include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 708 can have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 708 can be made capable of supporting any of a variety of instruction sets.

Referring now to other illustrative components depicted as being stored in the data storage 718, the 0/S 720 can be loaded from the data storage 718 into the memory 710 and can provide an interface between other application software executing on the computing device 702 and hardware resources of the computing device 702. More specifically, the 0/S 720 can include a set of computer-executable instructions for managing hardware resources of the computing device 702 and for providing common services to other application programs. In certain example embodiments, the 0/S 720 can include or otherwise control execution of one or more of the engines/program modules stored in the data storage 718. The O/S 720 can include any operating system now known or which can be developed in the future including, but not limited to, any server operating system, any mainframe operating system, or any other proprietary or non-proprietary operating system.

The DBMS 722 can be loaded into the memory 710 and can support functionality for accessing, retrieving, storing, and/or manipulating data stored in the memory 710, data stored in the data storage 718, and/or data stored in external datastore(s) (not shown in FIG. 7). The DBMS 722 can use any of a variety of database models (e.g., relational model, object model, etc.) and can support any of a variety of query languages. The DBMS 722 can access data represented in one or more data schemas and stored in any suitable data repository. Datastore(s) that may be accessible by the computing device 702 via the DBMS 722, can include, but are not limited to, databases (e.g., relational, object-oriented, etc.), file systems, flat files, distributed datastores in which data is stored on more than one node of a computer network, peer-to-peer network datastores, or the like.

Referring now to other illustrative components of the computing device 702, the input/output (I/O) interface(s) 712 can facilitate the receipt of input information by the computing device 702 from one or more I/O devices as well as the output of information from the computing device 702 to the one or more I/O devices. The I/O devices can include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components can be integrated into the computing device 702 or can be separate therefrom. The I/O devices can further include, for example, any number of peripheral devices such as data storage devices, printing devices, and so forth.

The I/O interface(s) 712 can also include an interface for an external peripheral device connection such as universal serial bus (USB), FireWire, Thunderbolt, Ethernet port or other connection protocol that can connect to one or more networks. The I/O interface(s) 712 can also include a connection to one or more antennas to connect to one or more networks via a wireless local area network (WLAN) (such as Wi-Fi) radio, Bluetooth, and/or a wireless network radio, such as a radio capable of communication with a wireless communication network such as a Long Term Evolution (LTE) network, WiMAX network, 3G network, etc.

The computing device 702 can further include one or more network interfaces 714 via which the computing device 702 can communicate with any of a variety of other systems, platforms, networks, devices, and so forth. The network interface(s) 714 can enable communication, for example, with the sensors 707 and/or one or more other devices via one or more of the network(s) 706. In example embodiments, the network interface(s) 714 provide a two-way data communication coupling to one or more network links that are connected to one or more of the network(s) 706. For example, the network interface(s) 714 may include an integrated services digital network (ISDN) card, a cable modem, a satellite modem, or a modem to provide a data communication connection to a corresponding type of telephone line. As another non-limiting example, the network interface(s) 714 may include a local area network (LAN) card to provide a data communication connection to a compatible LAN (or a wide area network (WAN) component to communicate with a WAN). Wireless links may also be implemented. In any such implementation, the network interface(s) 714 may send and receive electrical, electromagnetic, or optical signals that carry digital data streams representing various types of information.

A network link typically provides data communication through one or more networks to other data devices. For example, a network link may provide a connection through a local network to a host computer or to data equipment operated by an Internet Service Provider (ISP). The ISP, in turn, may provide data communication services through the world wide packet data communication network now commonly referred to as the "Internet". Local networks and the Internet both use electrical, electromagnetic, or optical signals that carry digital data streams. The signals through the various network(s) 707 and the signals on network links and through the network interface(s) 714, which carry the digital data to and from the computing device 702, are example forms of transmission media. In example embodiments, the computing device 702 can send messages and receive data, including program code, through the network(s) 706, network links, and network interface(s) 714. For instance, in the Internet example, a server might transmit a requested code for an application program through the Internet, the ISP, a local network, and a network interface 714. The received code may be executed by a processor 708 as it is received, and/or stored in the data storage 718, or other non-volatile storage for later execution.

It should be appreciated that the engines depicted in FIG. 7 as part of the computing device 702 are merely illustrative and not exhaustive. In particular, functionality can be modularized in any suitable manner such that processing described as being supported by any particular engine can alternatively be distributed across multiple engines, program modules, components, or the like, or performed by a different engine, program module, component, or the like. Further, one or more depicted engines may or may not be present in certain embodiments, while in other embodiments, additional engines not depicted can be present and can support at least a portion of the described functionality and/or additional functionality. In addition, various engine(s), program module(s), script(s), plug-in(s), Application Programming Interface(s) (API(s)), or any other suitable computer-executable code hosted locally on the computing device 702 and/or hosted on other computing device(s) (e.g., 702) accessible via one or more of the network(s) 706, can be provided to support functionality provided by the engines depicted in FIG. 7 and/or additional or alternate functionality. In addition, engines that support functionality described herein can be implemented, at least partially, in hardware and/or firmware and can be executable across any number of computing devices 702 in accordance with any suitable computing model such as, for example, a client-server model, a peer-to-peer model, and so forth.

It should further be appreciated that the computing device 702 can include alternate and/or additional hardware, software, and/or firmware components beyond those described or depicted without departing from the scope of the invention. More particularly, it should be appreciated that software, firmware, and/or hardware components depicted as forming part of the computing device 702 are merely illustrative and that some components may or may not be present or additional components may be provided in various embodiments. It should further be appreciated that each of the engines depicted and described represent, in various embodiments, a logical partitioning of supported functionality. This logical partitioning is depicted for ease of explanation of the functionality and may or may not be representative of the structure of software, hardware, and/or firmware for implementing the functionality.

In general, the terms engine, program module, or the like, as used herein, refer to logic embodied in hardware, firmware, and/or circuitry, or to a collection of software instructions, possibly having entry and exit points, written in a programming language, such as, for example, Java, C or C++. A software engine/module may be compiled and linked into an executable program, installed in a dynamic link library, or may be written in an interpreted programming language such as, for example, BASIC, Perl, or Python. It will be appreciated that software engines/modules may be callable from other engines/modules or from themselves, and/or may be invoked in response to detected events or interrupts. Software engines/modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. "Open source" software refers to source code that can be distributed as source code and/or in compiled form, with a well-publicized and indexed means of obtaining the source, and optionally with a license that allows modifications and derived works. Software instructions may be embedded in firmware and stored, for example, on flash memory such as erasable programmable read-only memory (EPROM). It will be further appreciated that hardware modules/engines may include connected logic units, such as gates and flip-flops, and/or may be further include programmable units, such as programmable gate arrays or processors.

Example embodiments are described herein as including engines or program modules. Such engines/program modules may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a field programmable gate array (FPGA) or an application specific integrated circuit (ASIC). A hardware engine may also include programmable logic or circuitry that is temporarily configured by software to perform certain operations. For example, a hardware engine may include a general-purpose processor or other programmable processor configured by software, in which case, the configured processor becomes a specific machine uniquely tailored to perform the configured functions and no longer constitute general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the term "engine" or "program module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware engines are temporarily configured (e.g., programmed), each of the hardware engines need not be configured or instantiated at any one instance in time. For example, where a hardware engine includes a general-purpose processor configured by software to become a special-purpose processor, the general-purpose processor may be configured as respectively different special-purpose processors (e.g., comprising different hardware engines) at different times. Software accordingly can configure a particular processor or processors, for example, to constitute a particular hardware engine at a given instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute an implementation of a hardware engine. Similarly, the methods described herein may be at least partially processor-implemented, with a particular processor or processors being an example of hardware. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations of example methods described herein may be distributed among multiple processors, not only residing within a single machine, but deployed across a number of machines. In some example embodiments, the processors may be located in a single geographic location (e.g., within a home environment, an office environment, or a server farm). In other example embodiments, the processors may be distributed across a number of geographic locations.

The present invention may be implemented as a system, a method, and/or a computer program product. The computer program product may include a computer readable storage medium (or media) having computer readable program instructions embodied thereon for causing a processor to carry out aspects of the present invention.

The computer readable storage medium is a form of non-transitory media, as that term is used herein, and can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. The computer readable storage medium, and non-transitory media more generally, may include non-volatile media and/or volatile media. A non-exhaustive list of more specific examples of a computer readable storage medium includes the following: a portable computer diskette such as a floppy disk or a flexible disk; a hard disk; a random access memory (RAM), a read-only memory (ROM), an erasable programmable read-only memory (EPROM or Flash memory), a static random access memory (SRAM), or any other memory chip or cartridge; a portable compact disc read-only memory (CD-ROM); a digital versatile disk (DVD); a memory stick; a solid state drive; magnetic tape or any other magnetic data storage medium; a mechanically encoded device such as punch-cards or raised structures in a groove having instructions recorded thereon or any physical medium with patterns of holes; any networked versions of the same; and any suitable combination of the foregoing.

Non-transitory media is distinct from transmission media, and thus, a computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Non-transitory media, however, can operate in conjunction with transmission media. In particular, transmission media may participate in transferring information between non-transitory media. For example, transmission media can include coaxial cables, copper wire, and/or fiber optics, including the wires that include at least some of the bus(es) 702. Transmission media can also take the form of acoustic or light waves, such as those generated during radio-wave and infra-red data communications.

Computer readable program instructions described herein can be downloaded to respective computing/processing devices from a computer readable storage medium or to an external computer or external storage device via a network, for example, the Internet, a local area network (LAN), a wide area network (WAN), and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider (ISP)). In some embodiments, electronic circuitry including, for example, programmable logic circuitry, FPGAs, or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The various features and processes described above may be used independently of one another or may be combined in various ways. All possible combinations and sub-combinations are intended to fall within the scope of the invention. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

The flowchart and block diagrams in the Figures illustrate the architecture, functionality, and operation of possible implementations of systems, methods, and computer program products according to various embodiments of the invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed partially, substantially, or entirely concurrently, or the blocks may sometimes be executed in the reverse order, depending upon the functionality involved.

It should be emphasized that many variations and modifications may be made to the above-described embodiments, the elements of which are to be understood as being among other example embodiments of the invention. All such modifications and variations are intended to be included herein within the scope of the invention. While example embodiments of the invention may be referred to herein, individually or collectively, by the term "invention," this is merely for convenience and does not limit the scope of the invention to any single disclosure or concept if more than one is, in fact, disclosed. The foregoing description details certain embodiments of the invention. It will be appreciated, however, that no matter how detailed the foregoing appears in text, the invention can be practiced in many ways. It should be noted that the use of particular terminology when describing certain features or aspects of the invention should not be taken to imply that the terminology is being re-defined herein to be restricted to including any specific characteristics of the features or aspects of the invention with which that terminology is associated.

The embodiments illustrated herein are described in sufficient detail to enable those skilled in the art to practice the teachings disclosed. Other embodiments may be used and derived therefrom, such that structural and logical substitutions and changes may be made without departing from the scope of the invention. The Detailed Description, therefore, is not to be taken in a limiting sense, and the scope of various embodiments is defined only by the appended claims, along with the full range of equivalents to which such claims are entitled.

Although the invention(s) have been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

As used herein, the term "or" may be construed in either an inclusive or exclusive sense. Moreover, plural instances may be provided for resources, operations, or structures described herein as a single instance. Additionally, boundaries between various resources, operations, program modules, engines, and/or datastores are somewhat arbitrary, and particular operations are illustrated in a context of specific illustrative configurations. Other allocations of functionality are envisioned and may fall within a scope of various embodiments of the invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the invention as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. In addition, it should be appreciated that any operation, element, component, data, or the like described herein as being based on another operation, element, component, data, or the like can be additionally based on one or more other operations, elements, components, data, or the like. Accordingly, the phrase "based on," or variants thereof, should be interpreted as "based at least in part on."

What is claimed is:

1. A computer-implemented method for selecting and presenting vehicle output in a particular language variant depending on an identity of an occupant of a vehicle, the method comprising:
   receiving location data indicative of a current location of the vehicle;
   dynamically determining that a first language variant corresponding to a first occupant is associated with the current location of the vehicle;
   determining that a second occupant has entered the vehicle;
   determining that the first occupant has exited the vehicle either prior to or after the second occupant has entered the vehicle;
   determining whether a user profile for the second occupant exists;
   in response to determining that the user profile exists:
      determining that the user profile indicates a preference for a second language variant that is different from the first language variant;
      switching the vehicle output from the first language variant to the second language variant; and
      switching the vehicle output from the first language variant to the second language variant.

2. The computer-implemented method of claim 1, wherein dynamically determining that the first language variant is associated with the current location of the vehicle comprises:
   identifying a group of geographic regions, each of which is associated with a respective language variant;
   determining a particular geographic region that includes the current location of the vehicle; and
   determining that the first language variant corresponds to the particular geographic region based at least in part on a stored association between the first language variant and the particular geographic region.

3. The computer-implemented method of claim 1, wherein the first occupant of the vehicle lacks an existing user profile, and wherein the current location of the vehicle is a location that is within a predetermined radius of a location at which the first occupant entered the vehicle.

4. The computer-implemented method of claim 1, wherein the current location of the vehicle is a first location, the method further comprising:
   in response to determining that the user profile for the second occupant is nonexistent:
      receiving location data indicative of a second location of the vehicle, wherein the second location is a location that is within a predetermined radius of a location at which the second occupant entered the vehicle;
      determining that the second location is associated with a third language variant that is different from the first language variant; and
      switching the vehicle output from the first language variant to the third language variant.

5. The computer-implemented method of claim 4, wherein determining that the second location is associated with a third language variant that is different from the first language variant comprises:
   determining a first geographic region that includes the first location;
   determining that the first language variant corresponds to the first geographic region based at least in part on a stored association between the first language variant and the first geographic region;
   determining that a second geographic region includes the second location; and
   determining that the second language variant corresponds to the second geographic region based at least in part on a stored association between the second language variant and the second geographic region.

6. The computer-implemented method of claim 5, wherein the second location is outside of a boundary of the first geographic region.

7. The computer-implemented method of claim 5, wherein the first geographic region and the second geographic region include an overlapping sub-region that includes the second location, the method further comprising selecting the second language variant for the vehicle output based at least in part on a navigation route of the vehicle.

8. The computer-implemented method of claim 7, wherein selecting the second language variant for the vehicle output based at least in part on a navigation route of the vehicle comprises determining that the vehicle is travelling along a portion of the navigation route that extends out of the overlapping sub-region and into another sub-region of the second geographic region that does not overlap with the first geographic region.

9. The computer-implemented method of claim 1, further comprising:
   receiving sensor data from one or more sensor on-board the vehicle;
   analyzing the sensor data to determine a quantitative metric indicative of a sentiment of the first occupant of the vehicle to the first language variant; and
   modifying or creating a user profile for the first occupant of the vehicle that indicates the sentiment of the first occupant of the vehicle to the first language variant.

10. A system for selecting and presenting vehicle output in a particular language variant depending on an identity of a vehicle occupant, the system comprising:
   at least one processor; and
   at least one memory storing computer-executable instructions, wherein the at least one processor is configured to access the at least one memory and execute the computer-executable instructions to:
      receive location data indicative of a current location of the vehicle;
      dynamically determine that a first language variant corresponding to a first occupant is associated with the current location of the vehicle;
      determine that a second occupant has entered the vehicle;
      determine that the first occupant has exited the vehicle either prior to or after the second occupant has entered the vehicle;

determine whether a user profile for the second occupant exists;
in response to determining that the user profile exists:
determine that the user profile indicates a preference for a second language variant that is different from the first language variant;
switch the vehicle output from the first language variant to the second language variant; and
switch the vehicle output from the first language variant to the second language variant.

11. The system of claim 10, wherein the at least one processor is configured to dynamically determine that the first language variant is associated with the current location of the vehicle by executing the computer-executable instructions to:
identify a group of geographic regions, each of which is associated with a respective language variant;
determine a particular geographic region that includes the current location of the vehicle; and
determine that the first language variant corresponds to the particular geographic region based at least in part on a stored association between the first language variant and the particular geographic region.

12. The system of claim 10, wherein the first occupant of the vehicle lacks an existing user profile, and wherein the current location of the vehicle is a location that is within a predetermined radius of a location at which the first occupant entered the vehicle.

13. The system of claim 10, wherein the current location of the vehicle is a first location, and wherein the at least one processor is further configured to execute the computer-executable instructions to:
in response to determining determine that the user profile for the second occupant is nonexistent:
receive location data indicative of a second location of the vehicle, wherein the second location is a location that is within a predetermined radius of a location at which the second occupant entered the vehicle;
determine that the second location is associated with a third language variant that is different from the first language variant; and
switch the vehicle output from the first language variant to the third language variant.

14. The system of claim 13, wherein the at least one processor is configured to determine that the second location is associated with a third language variant that is different from the first language variant by executing the computer-executable instructions to:
determine a first geographic region that includes the first location;
determine that the first language variant corresponds to the first geographic region based at least in part on a stored association between the first language variant and the first geographic region;
determine that a second geographic region includes the second location; and
determine that the second language variant corresponds to the second geographic region based at least in part on a stored association between the second language variant and the second geographic region.

15. The system of claim 14, wherein the second location is outside of a boundary of the first geographic region.

16. The system of claim 14, wherein the first geographic region and the second geographic region include an overlapping sub-region that includes the second location, and wherein the at least one processor is further configured to execute the computer-executable instructions to select the second language variant for the vehicle output based at least in part on a navigation route of the vehicle.

17. The system of claim 16, wherein the at least one processor is configured to select the second language variant for the vehicle output based at least in part on a navigation route of the vehicle by executing the computer-executable instructions to determine that the vehicle is travelling along a portion of the navigation route that extends out of the overlapping sub-region and into another sub-region of the second geographic region that does not overlap with the first geographic region.

18. The system of claim 10, wherein the at least one processor is further configured to execute the computer-executable instructions to:
receive sensor data from one or more sensor on-board the vehicle;
analyze the sensor data to determine a quantitative metric indicative of a sentiment of the first occupant of the vehicle to the first language variant; and
modify or create a user profile for the first occupant of the vehicle that indicates the sentiment of the first occupant of the vehicle to the first language variant.

19. A system for selecting and presenting vehicle output in a particular language variant depending on an identity of a vehicle occupant, the system comprising:
at least one processor; and
at least one memory storing computer-executable instructions, wherein the at least one processor is configured to access the at least one memory and execute the computer-executable instructions to:
receive location data indicative of a current location of the vehicle;
dynamically determine that a first language variant corresponding to a first occupant is associated with the current location of the vehicle;
determine that a second occupant has entered the vehicle;
determine that the first occupant has exited the vehicle either prior to or after the second occupant has entered the vehicle;
determine whether a user profile for the second occupant exists;
in response to determining that the user profile is nonexistent:
receive location data indicative of a second location of the vehicle, wherein the second location is a location that is within a predetermined radius of a location at which the second occupant entered the vehicle;
determine that the second location is associated with a second language variant that is different from the first language variant; and
switch the vehicle output from the first language variant to the second language variant.

* * * * *